No. 665,584. Patented Jan. 8, 1901.
J. J. SEARS & G. FISHBURN.
COMPUTING SCALE.
(Application filed Mar. 7, 1900.)

(No Model.) 4 Sheets—Sheet 1.

Fig. I.

WITNESSES: H. Walker, John Looker

INVENTORS: J. J. Sears, G. Fishburn

ATTORNEYS

No. 665,584. Patented Jan. 8, 1901.
J. J. SEARS & G. FISHBURN.
COMPUTING SCALE.
(Application filed Mar. 7, 1900.)

(No Model.) 4 Sheets—Sheet 3.

No. 665,584. Patented Jan. 8, 1901.
J. J. SEARS & G. FISHBURN.
COMPUTING SCALE.
(Application filed Mar. 7, 1900.)
(No Model.) 4 Sheets—Sheet 4.

WITNESSES:
H. Walker
John Lotka

INVENTORS
J. J. Sears
G. Fishburn
BY
ATTORNEYS

UNITED STATES PATENT OFFICE.

JOHN JOSEPH SEARS, OF DAYTON, OHIO, AND GEORGE FISHBURN, OF SYDNEY, NEW SOUTH WALES.

COMPUTING-SCALE.

SPECIFICATION forming part of Letters Patent No. 665,584, dated January 8, 1901.

Application filed March 7, 1900. Serial No. 7,666. (No model.)

*To all whom it may concern:*

Be it known that we, JOHN JOSEPH SEARS, importer, of Dayton, in the county of Montgomery, in the State of Ohio, and GEORGE FISHBURN, contractor, of the city of Sydney, in the Colony of New South Wales, have invented new and useful Improvements in Computing-Scales, of which the following is a specification.

Our invention relates to improvements in computing-scales; and the object of our improvements is to provide a machine which will print on a card or slip of paper the computed value, while at the same time it will indicate the weight.

Figure 1:
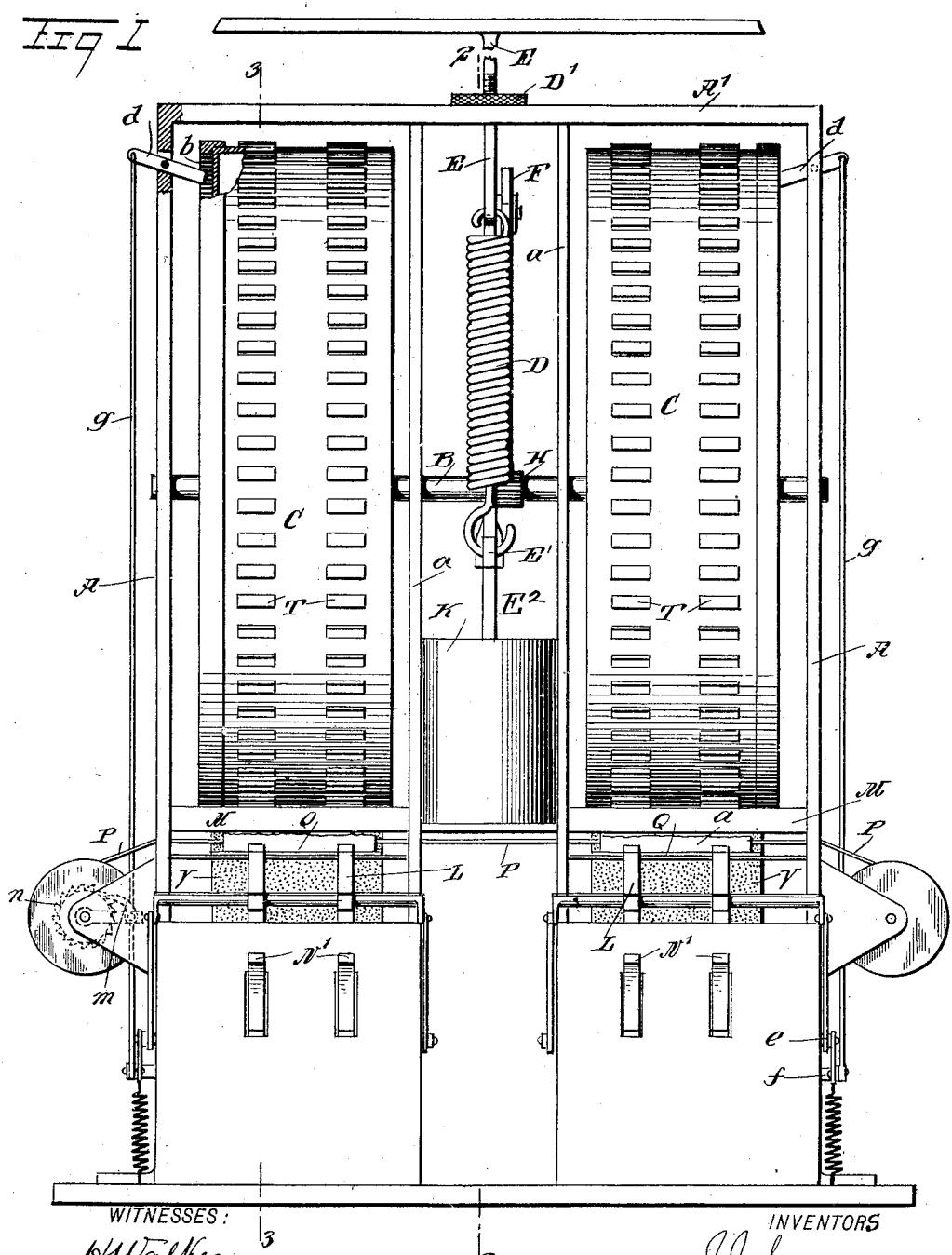
Figure 2:
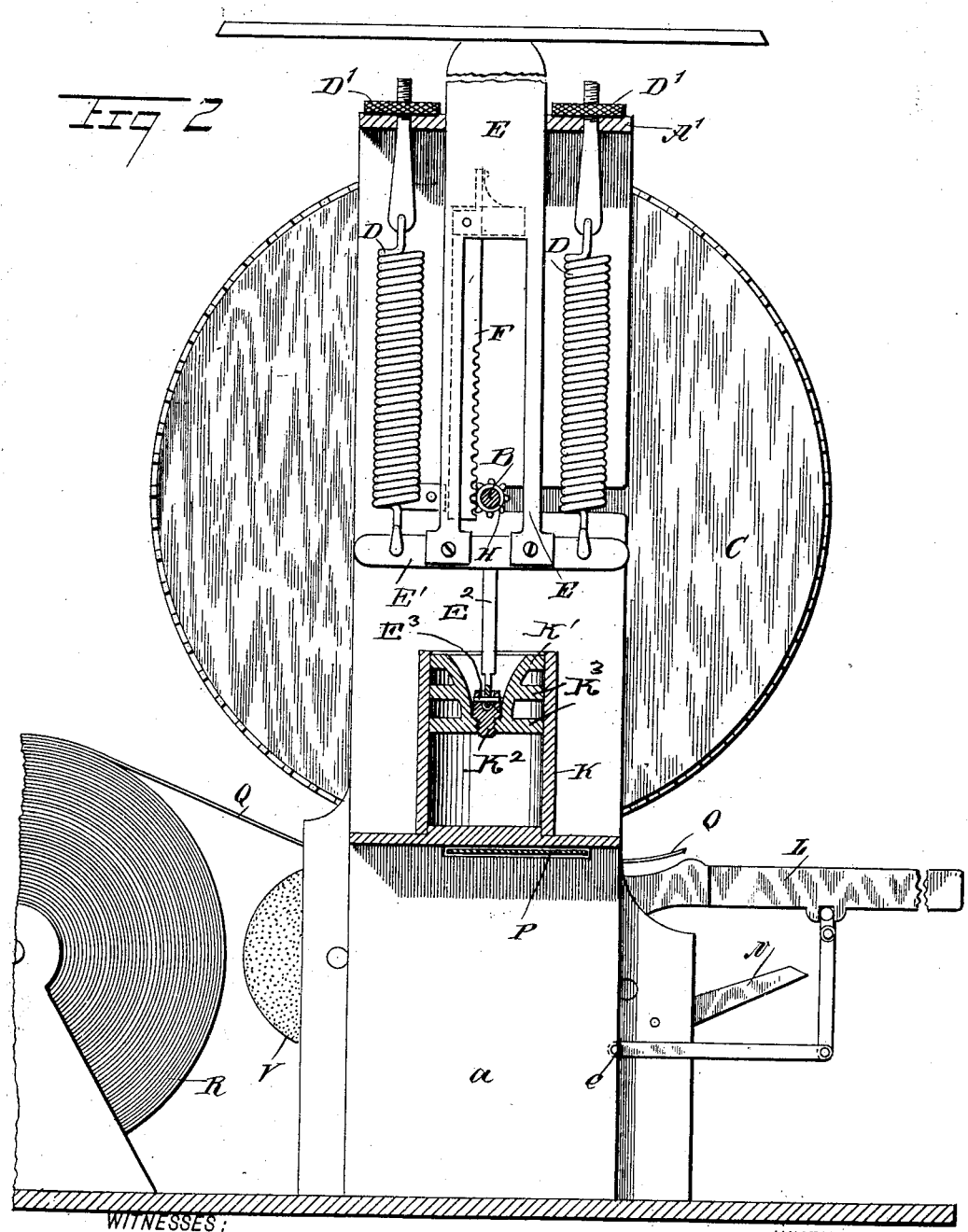
Figure 3:
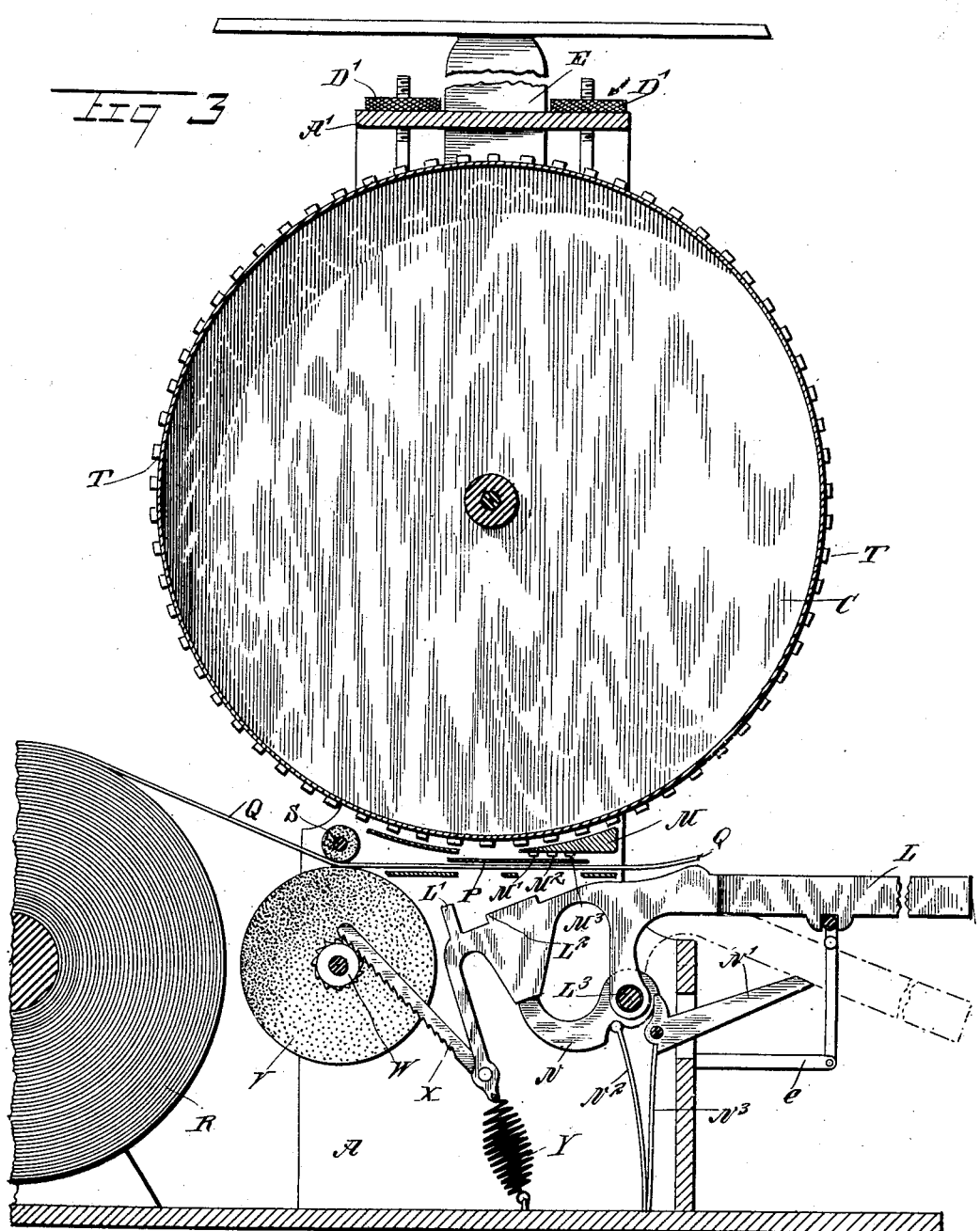
Figure 4:
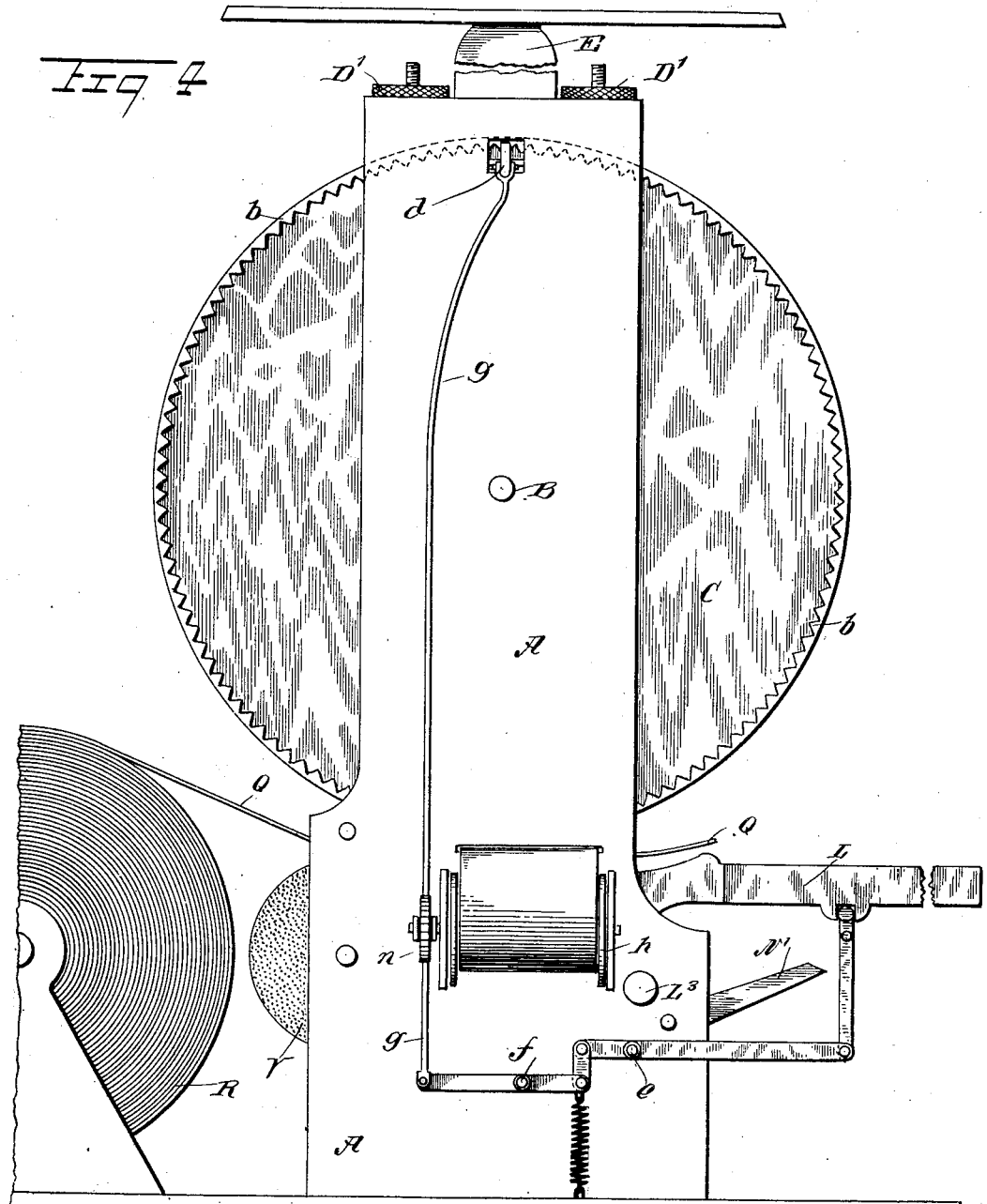

In the drawings, Figure 1 is a front elevation showing two revolving drums with the spring weighing mechanism between them. Fig. 2 shows the end of one drum and spring weighing mechanism. Fig. 3 is a vertical section showing the printing mechanism. Fig. 4 is an end view showing the method of operating the ribbon-reel and regulating-stop.

Similar letters refer to similar parts throughout the several views.

A A are standards in which the shaft B, carrying the drums C C, revolves.

$a$ $a$ are inner standards between which the weighing mechanism is placed. The latter is clearly shown in Fig. 2, and consists of two spiral springs D D, suspended from the top of cross-piece A' and regulated by means of tension-nuts D' D'. To the bottom of these springs is hung a bar E', bearing a standard E, which passes through an aperture in the cross-piece A'. The pan or platform on which the goods to be weighed are placed is attached to the top of standard E.

F is a swinging toothed rack attached to standard E. This rack engages a toothed wheel H, which is keyed to the shaft B, so that when a weight is placed in the pan or platform the standard E descends and the drums C C, secured to said shaft, revolve.

K is a dash-pot containing a piston K', connected with the bar E', for the purpose of checking the oscillation of the drums. The connection, as shown, is made by means of a vertical rod $E^2$, integral with or rigidly secured to the bar E' and having at its lower end an aperture or eye through which passes a pin $E^3$, also passing through apertures in a plug $K^2$, screwed centrally into the piston K'. The piston, as shown, consists of a body having three superposed rings $K^3$, engaging the walls of the cylinder or dash-pot K. The drums C C may be made of thin sheet metal or other suitable material. Around the periphery of each drum is a series of rings of type T, each ring representing the computed values of any series of weights at a given rate. Directly underneath each of the said rings of type is a lever L, Fig. 3, working on a shaft $L^3$. This lever is so constructed that when the long end is depressed to the position shown by the dotted lines a projection L' on the short end is pressed firmly against the type at the lowest point of the drum. A projection $L^2$ is at the same time pressed against a series of stationary type M' $M^2$ $M^3$ on a stationary bar M for the purpose of printing words such as "price," "weight," "rate," or the like as required. When the lever is in this position, the hammer N is released by the lever L coming into contact with a short lever N', the hammer N being held stationary until such contact is made. Immediately underneath the type and running parallel with the axis of the drum is a ribbon P, impregnated with printing-ink similar to that used in type-writers, and underneath the ribbon, running in a direction at right angles thereto, is the paper Q, on which the impression is to be made, so that when the lever L is operated the ribbon and paper are pressed firmly against the type, and the hammer N being released strikes a sharp blow and causes a good impression of the type to be made on the paper.

The levers L may be suitably distinguished from each other by color or signs or may be used even without distinguishing marks, since it will be easy to remember, for instance, that the levers from left to right are to be used for goods costing, say, ten, fifteen, twenty, and twenty-five cents a pound, respectively.

The roll or strip of paper Q is operated as follows:

R is a drum or reel on which the supply of paper is wound.

S is a small rubber roller resting on and revolving in conjunction with another roller V of larger diameter. The paper Q passes between these two rollers, and the supply is regulated and controlled by the action of the toothed rack X, which engages a ratchet-wheel W and causes the roller V to revolve with the backward action of the lever L.

As shown in Fig. 1, each of the drums C has its separate paper strip Q, and the actuating devices for one of these strips are separate from those of the other strip.

Y is a spring of sufficient strength to compress the hammer-spring $N^2$ and cause the lever L to return to the position shown in the drawings.

To insure exactitude and steadiness in the position of the type at the moment of printing, a toothed ring is constructed on one end of either or both of the drums C C, preferably around the inner periphery, as shown at $bb$, Fig. 4. These teeth correspond with the type on the outer periphery, and a regulating-stop $d$ is inserted, by means of a lever mechanism hereinafter described, into the spaces between the said teeth.

$e$ and $f$ are fixed points so arranged that when the long end of the lever L is depressed the rod $g$ is lowered and the regulating-stop $d$ is forced into the position between two of the teeth $b\ b$. The reverse movement of the lever L operates the ribbon-roller $h$ by means of a pawl $m$ and ratchet-wheel $n$.

The method of operating our machine is as follows: The goods are placed on the pan or platform, which depresses the standard E and causes the drums C C to revolve, the dash-pot K modifying the oscillation and preventing a strain on the springs. The lever corresponding to the rate at which the goods are to be sold is then depressed by the operator. This causes the regulating-stop $d$ to enter between two of the teeth $b\ b$, thus insuring that the type indicating the value of the goods at the ascertained weight is held immovably in the right position while the impression is being taken therefrom. This movement of the lever at the same time operates the printing mechanism, as hereinbefore described, its backward movement delivering the printed ticket.

What we claim as our invention, and desire to secure by Letters Patent, is—

1. In a weighing and printing machine, the combination of a revolving drum provided with type, the weighing-platform operatively connected with the said drum, means for carrying paper adjacent to the type, the printing-lever arranged to press the paper against the type, and the impression-hammer arranged to strike the printing-lever.

2. In a weighing and printing machine, the combination of a revolving drum provided with type, the weighing-platform operatively connected with the said drum, means for carrying paper adjacent to the type, the printing-lever arranged to press the paper against the type, the impression-hammer arranged to strike the printing-lever, and a locking-lever for normally holding said hammer stationary, said locking-lever extending into the path of the printing-lever so as to be operated thereby to release the impression-hammer.

3. The combination of the weighing-platform with a type-carrier provided with a plurality of series of types all held to move in unison with the platform, rolls for carrying paper adjacent to said carrier, stationary type located adjacent to that portion of the carrier which is in the printing position, an independent printing-lever for each series of types, arranged to press the paper against both the stationary and the movable types, an impression-hammer arranged to strike the printing-lever, a locking-lever for normally holding said hammer stationary, said locking-lever extending into the path of the printing-lever so as to be operated thereby to release the impression-hammer, a stop for locking the movable type-carrier during the printing operation, connections from said stop located in operative relation to each of the printing-levers, and means for feeding the paper after each printing operation.

4. In a weighing, computing and printing machine, the combination of a revolving drum provided with type on its outer periphery, with a lever provided with a ratchet-bar operating a pair of rollers between which passes a strip of paper from a supply-drum and a spring-actuated hammer coöperating with the lever, for the purposes herein set forth and substantially as described.

5. The combination of the weighing-platform with a type-carrier carrying a plurality of series of types all held to move in unison with the platform, mechanism for feeding paper in registry with said types, and a series of independent printing devices, each in operative relation to one of the series of types.

6. The combination of the weighing-platform with a type-carrier carrying a plurality of series of types all held to move in unison with the platform, mechanism for feeding paper in registry with said types, a series of independent printing devices, each in operative relation to one of the series of types, and an operative connection from each printing device to the paper-feed mechanism.

7. The combination of the weighing-platform with a type-carrier carrying a plurality of series of types all held to move in unison with the platform, mechanism for feeding paper in registry with said types, a series of independent printing devices, each in operative relation to one of the series of types, and a stop operatively connected with each of the printing devices to hold the type-carrier stationary during the printing operation.

8. The combination of the weighing-platform with a type-carrier carrying a plurality of series of types all held to move in unison with the platform, mechanism for feeding paper in registry with said types, a series of independent printing devices, each in operative relation to one of the series of types, an ink-ribbon extending between the type-carrier and the paper and transversely of the the latter, and means, operatively connected 
5 with each of the printing devices, for feeding said ribbon at each printing operation.

Signed at Sydney, in the Colony of New South Wales, this 15th day of December, 1899, in presence of two witnesses.

JOHN JOSEPH SEARS.
GEORGE FISHBURN.

Witnesses:
C. A. LAURENCE,
T. C. ALEM.